Feb. 9, 1960 H. A. LORD ET AL 2,924,367
MOLDED EGG CARTON
Filed May 1, 1957 4 Sheets-Sheet 1
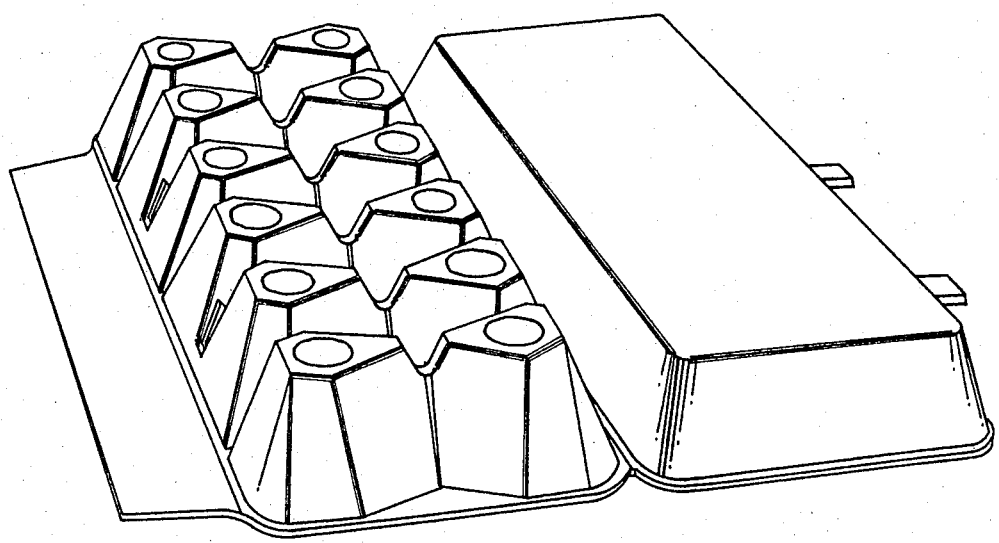
Fig. 1.
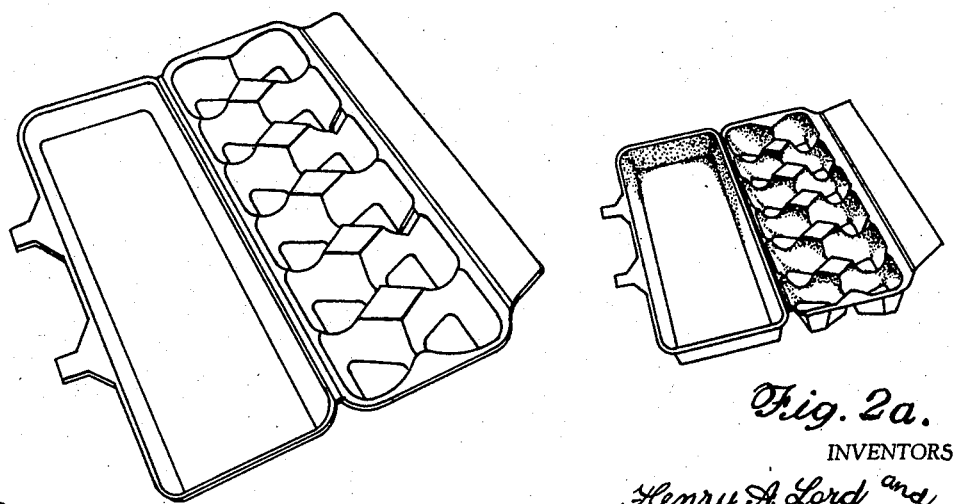
Fig. 2.
Fig. 2a.
INVENTORS
Henry A. Lord and
Harold S. Crane
BY Karl W. Flocks
ATTORNEY INVENTORS
Henry A. Lord
Harold S. Crane.
BY Karl W. Flocks
ATTORNEY Feb. 9, 1960

H. A. LORD ET AL 2,924,367

MOLDED EGG CARTON

Filed May 1, 1957

INVENTORS
Henry A. Lord and
Harold S. Crane.
BY
Karl W. Flocks
ATTORNEY

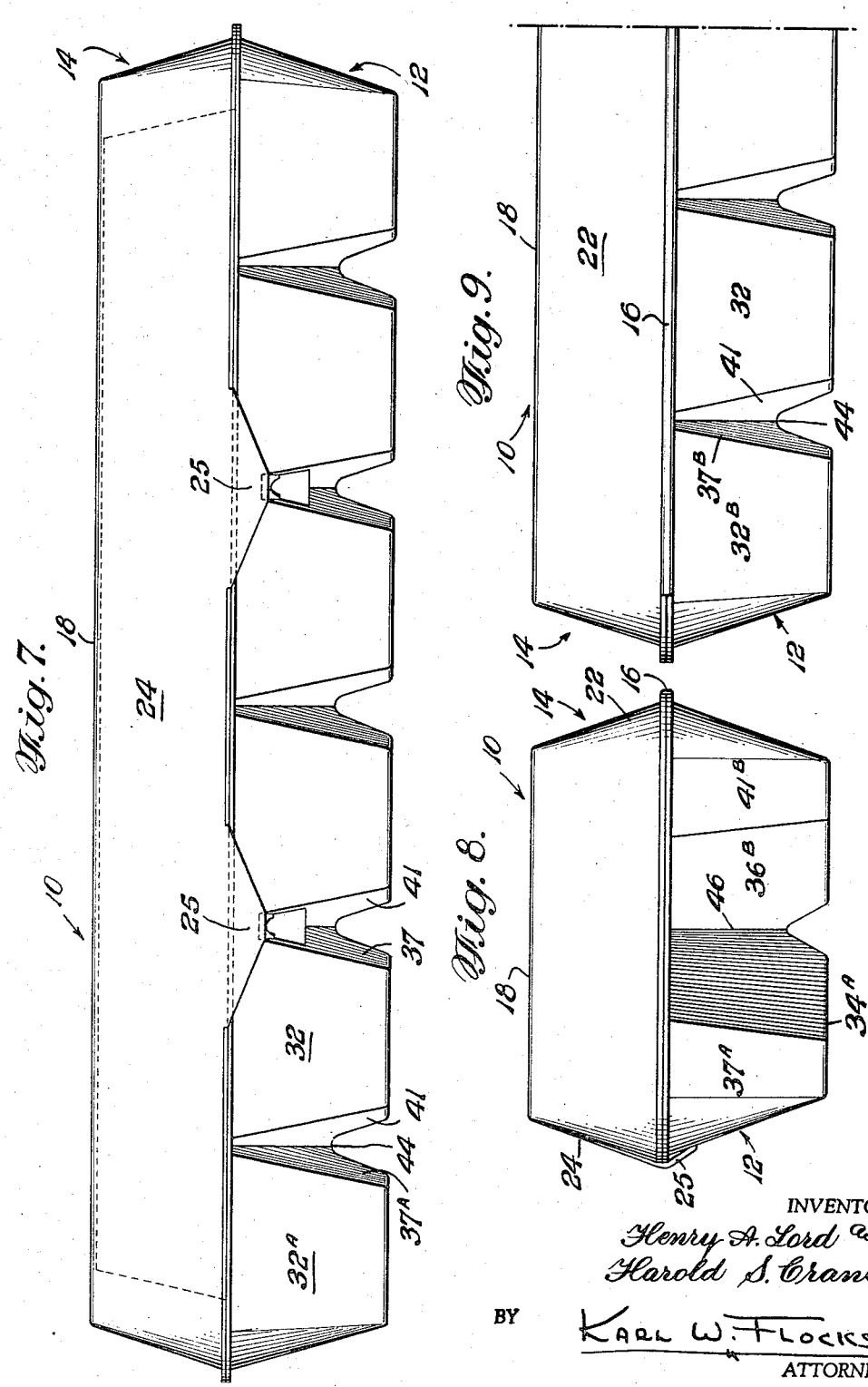

United States Patent Office 2,924,367
Patented Feb. 9, 1960

2,924,367

MOLDED EGG CARTON

Henry A. Lord and Harold S. Crane, Palmer, Mass., assignors to Diamond National Corporation, a corporation of Delaware Application May 1, 1957, Serial No. 656,256

1 Claim. (Cl. 229—2.5)

This invention relates to egg cartons, and more particularly to egg cartons of the molded pulp type.

In constructing an egg carton, an important desideratum is the provision of egg-receiving cells which will properly support and cushion the eggs contained therein against damage caused by dropping, shaking, rattling, and horizontal shock. A further important desideratum is to have egg cells which are capable of accommodating various sizes and shapes of eggs, including eggs of more or less irregular shapes.

An egg cell which is shaped as to provide three-point contact, in accordance with the instant invention, in the same horizontal plane, with the egg contained therein maintains constant positive contact with the egg at all times and even maintains an irregularly shaped egg in a steady, stable position.

Attempts have been made in the prior art to construct egg cartons having cells which provide three-point contact with the eggs in a horizontal plane. Several of the prior art constructions of this type provide three vertical wall portions in each cell which engage the egg at spaced points to obtain a form of three-point contact between the vertical cell walls and the egg. In the various prior art constructions, the three wall portions which provide the three-point contact in each cell include an outer wall portion which is part of the outer wall of the lower section of the carton and two inner wall portions which are formed by pillars or posts disposed along the central longitudinal axis of the carton. The inner cell wall portions formed by the pillars in such prior constructions, are not joined in any manner to the outer wall portion, and extend for only a relatively short portion of the total perimeter of an imaginary triangle defined when the two inner walls are projected to meet each other and the outer wall.

Due to the relative shortness of the inner cell walls of the prior art three-point contact constructions, the inner walls are relatively inflexible, with the result that the outer wall of each cell, lying in the outer wall of the lower section of the carton, must move a greater distance than the inner cell walls to accommodate the eggs positioned in the cells. With large size eggs, the movement of the outer wall may be sufficiently great to prevent proper closure of the carton. Furthermore, in the prior art egg cartons just described, the three points of contact of the cell walls with the egg are not symmetrically spaced around the egg, with the result that the egg is not symmetrically supported about its periphery.

Accordingly, it is an object of this invention to provide an egg carton having egg-receiving cells which securely support eggs positioned therein against breakage and which support eggs having irregular surfaces against rocking or rattling in the cells.

It is another object of this invention to provide an egg carton having cells with a configuration which supports the eggs at substantially symmetrically spaced support points around the surface of the egg, and in which all walls of the egg-receiving cells are flexed in a substantially uniform manner by eggs positioned within the cells.

It is still another object of the invention to provide an egg carton having egg-receiving cells whose walls are capable of flexing to provide a greater cushioning effect than egg cartons of the prior art.

It is a further object of the invention to provide an egg carton having egg-receiving cells which maintain constant positive contact with the eggs in the respective cells and thereby prevent movement of the eggs in the cells.

It is a still further object of the invention to provide an egg carton capable of receiving and holding a variety of shapes and sizes of eggs within the same carton.

A still further object of the invention is to provide an egg carton which is structurally strong and which resists externally applied forces tending to produce lateral and longitudinal deformation of the carton, while at the same time providing ample cushioning action on the eggs contained within the carton.

In achievement of these objectives, there is provided in accordance with an embodiment of this invention an egg carton of the molded pulp type including a bottom or egg-receiving section having a plurality of molded egg-receiving cells. Each cell includes an outer cell wall defining a part of one of the outer longitudinal walls of the carton, and a pair of side cell walls which converge toward each other and toward the central longitudinal axis of the carton. The outer bounding wall of each cell and the two converging side walls of each cell are each of substantially the same length and extend upwardly from a cell base which is of substantially equilateral triangular shape. The adjacent edges of the outer and side walls of the cell are joined together by relatively narrow auxiliary connecting walls to form an egg cell which has substantially the shape of an equilateral triangle in horizontal cross section.

Further objects and advantages of the invention will become apparent from the following description taken in conjunction with the accompanying drawings, in which:

Fig. 1 is a view of the fully opened egg carton in inverted position, showing the bottom section and the connected cover section of the carton in perspective;

Fig. 2 is a view of the fully opened egg carton, showing the inside of both the cover and bottom sections of the carton in perspective;

Fig. 2a is a view similar to Fig. 2 but on a reduced scale and taken from a lower observation point so as to show the end of the carton as well as the inside;

Fig. 7 is a front elevational view of the egg carton;

Fig. 8 is an end view of the egg carton looking from the right end of the view of Fig. 7; and Fig. 9 is a fragmentary rear view in vertical elevation of the egg carton.

Figure 3:
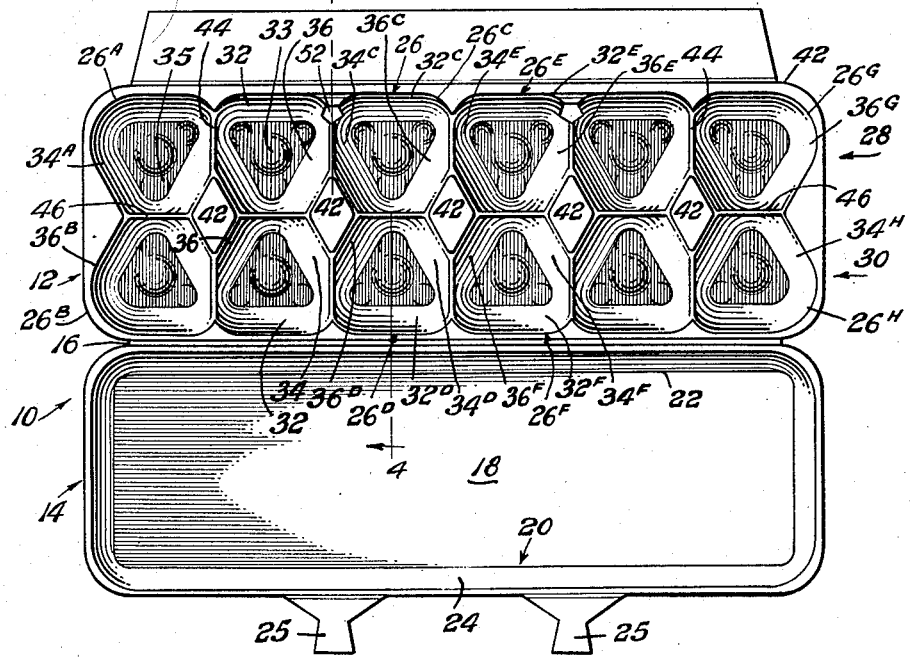
Fig. 3 is a top plan view of the inside of the egg carton in fully open position.

Referring now to the drawings, and more particularly to Figs. 3-9, inclusive, the egg carton is generally indicated at 10 and includes integral bottom and cover sections generally indicated at 12 and 14, respectively, formed of molded pulp, and connected together by a hinge 16.

Cover section 14 is of dished construction and includes a top wall 18 of generally rectangular shape having a peripheral wall 20 which extends downwardly and at a slight inclination outwardly along the entire periphery of top wall 18, with respect to the closed position of the carton. Downwardly and outwardly inclined wall 20 includes a rear wall portion 22 which terminates at hinge 16 and a forward or front wall portion 24 which carries a pair of spaced tab members 25 which engage slots in the lower section of the carton to hold the cover in closed position, as will be described hereinafter.

The bottom or egg-receiving section 12 of the carton includes a plurality of molded egg-receiving cells generally indicated at 26 which, in the illustrated embodiment, are arranged in two longitudinal rows 28 and 30 each having six cells, to thereby form a 2 x 6 carton. However, the cells may be arranged to form a 3 x 4 carton, or in other arrangements, if desired.

To facilitate the description which follows, certain of the cells 26 have been assigned specific reference numerals. Thus, the two end cells at the left of the view of Fig. 3 are designated as 26A and 26B, respectively; the four centrally disposed cells on either side of the central transverse axis of the carton have been identified as 26C, 26D, 26E and 26F, respectively; while the two cells at the right-hand end of the view of Fig. 3 have been designated as 26G and 26H, respectively.

Each cell 26 includes an outer wall 32 which lies in or forms part of either the front or rear longitudinal wall of the bottom section of the carton, depending on whether the cell lies in front longitudinal row 28 or rear longitudinal row 30. Each cell also includes a pair of side walls 34 and 36 which converge toward each other and toward the central longitudinal axis of the carton substantially from the opposite ends of outer cell wall 32. Cell walls 32, 34, 36 of each respective cell are of substantially equal length and together define an egg cell having substantially the shape of an equilateral triangle.

Outer cell wall 32 and the two side cell walls 34 and 36 of each cell taper downwardly and inwardly at a small angle from the vertical plane, such as an angle of 17½ degrees, for example, to merge with a horizontal cell base 35 having substantially the shape of an equilateral triangle. Each cell base 35 is provided at substantially the center thereof with a round portion 33 which is raised slightly above the remainder of the inside surface area of the cell base 35, and which serves as a support for the lower end or bottom of the egg.

Due to the slight inclination of cell walls 32, 34 and 36 from a vertical plane, the planes of the respective walls would intersect beyond the desired confines of the cell if the respective adjacent walls of each respective cell were projected until they intersected. Thus, for example, due to their inclination from a vertical plane, side walls 34 and 36 of any given cell would intersect on the opposite side of the longitudinal axis of the carton from that on which the respective cell lies. For this reason, adjacent cell walls 32, 34 and 36 are not projected until they actually intersect but instead are joined by relatively narrow auxiliary walls respectively identified as 37, 39, 41. Auxiliary wall 37 joins cell walls 32 and 34; auxiliary wall 39 joins cell walls 34 and 36; and auxiliary wall 41 joins cell walls 32 and 36. The auxiliary walls are of tapering width in a direction perimetrically of the cell, having their maximum width at their upper edge and their minimum width at their lower edge.

The outer walls 32 of the plurality of cells lying in row 28, together with the relatively narrow auxiliary walls 37 and 41, collectively define the forward wall of the bottom section of the carton. In a similar manner, outer walls 32 of the egg cells 26 lying in the rear longitudinal row 30 of the bottom section, together with the auxiliary walls 37 and 41 between adjacent walls 32, collectively define the rear longitudinal wall of the carton.

The bottom section 12 of the carton includes a plurality of spaced hollow post members 42 lying along the central longitudinal axis of the bottom section. Each post member 42 is formed by a portion of the side walls of four egg cells. Thus, the post member 42 which lies at the intersection of the central longitudinal and transverse axes of the carton is formed by portions of walls 36C, 34D, 34E and 36F of cells 26C, 26D, 26E and 26F, respectively.

A portion of the two side walls 34 and 36 of each cell except end cells 26A, 26B, 26G and 26H, as well as the connected auxiliary walls 37 and 41 of each cell, is of downwardly depressed arcuate shape when viewed from the inside of the carton, or of generally V-shape in vertical elevation. The bottom of the depressed V-shaped wall portion is of substantially lesser height than the tops of the hollow post members 42 and than the outer edge or rim of the lower carton section. The abutting depressed wall portions of each pair of adjacent cells in the same longitudinal row merge together to form a depressed ridge 44 lying between adjacent cells. The outer edge of ridge 44 also defines a web which connects the auxiliary walls 37 and 41 of adjacent cells.

In the case of end cells 26A, 26B, 26G and 26H, the respective walls 34A, 36B, 36G, 34H, and the auxiliary walls 37A, 41B, 37H and 41G extend to the full height of the rim of bottom section 14 and define the end walls of lower section 14 of the carton. Thus, cell walls 34A and 36B of end cells 26A and 26B together with auxiliary cell walls 37A and 41B (Fig. 5) define the left end wall of the bottom section of the carton, while cell walls 36G and 34H of cells 26G and 26H together with auxiliary cell walls 37H and 41G define the right end wall of the bottom section of the carton, with respect to the view shown in Fig. 5.

Along the opposite longitudinal sides of the carton, the upper edges of outer walls 32 of the egg cells, together with the upper edges of auxiliary walls 37 and 39 between each pair of adjacent cells form the rim or upper edge of lower carton section 12. At the ends of the lower carton section, the rim is formed by the upper edges of cell walls 34A, 36B, 36G and 34H of cells 26A, 26B, 26G and 26H, respectively, and by the upper edges of auxiliary walls 37A, 41B, 37H and 41G. The rim is of greater width at the ends than along the longitudinal edges of the lower carton section since the rim extends from the upper end of the inwardly tapered end cell walls out to a line perpendicular to the longitudinal edge of the carton, as indicated at 45, the wide rim portion 45 and the end cell walls connected thereto defining in effect a half post at each end of the lower section of the carton.

The auxiliary walls 39 of each pair of laterally opposite egg cells, such as cells 26C and 26D, for example, merge to define a depressed ridge 46 lying substantially along the central longitudinal axis of the carton. The lowest point of ridge 46 is positioned at a lesser height above base portion 35 of the respective cells than the lowest point of the generally V-shaped arcuate ridge 44 previously described. In the illustrated embodiment, the lowest point of ridge 46 is approximately half as high above cell base 33 as the lowest point of ridge 44.

Figure 4:
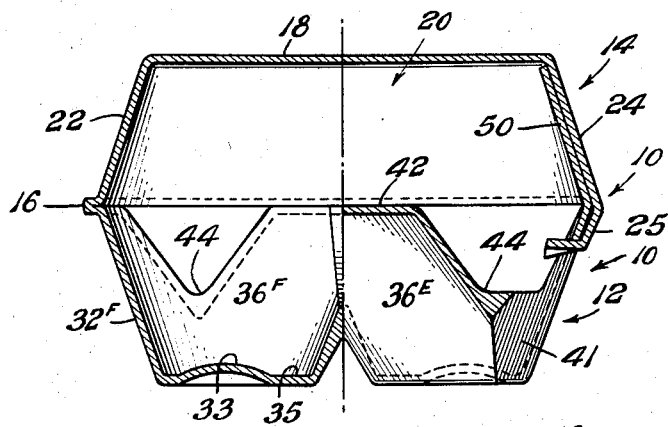
Fig. 4 is a view in transverse section of the egg carton taken along lines 4—4 of Figs. 3 and 5, when closed.
Figure 5:
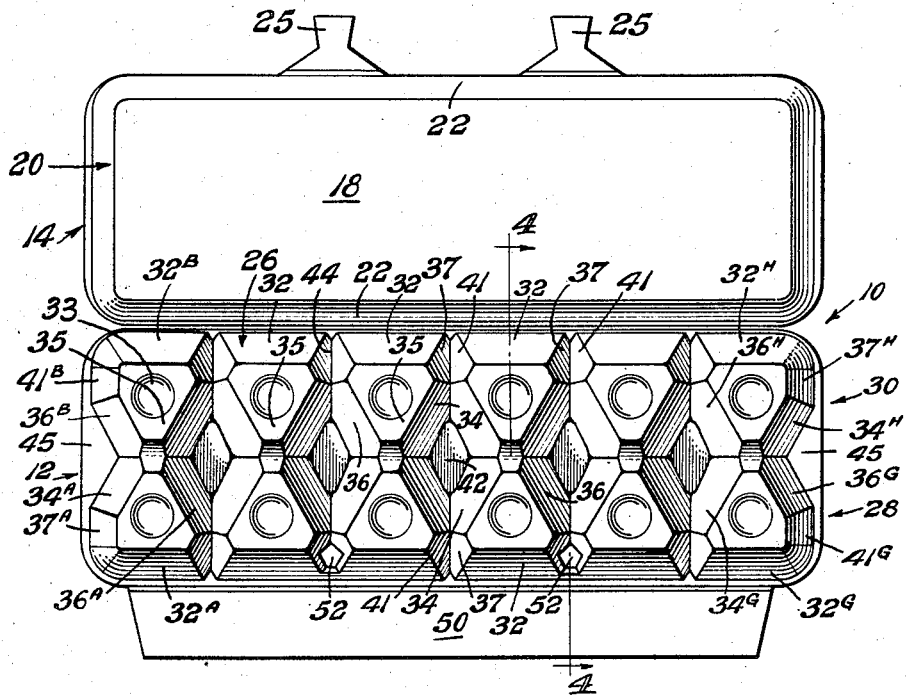
Fig. 5 is a bottom plan view of the egg carton in fully open position.
Figure 6:
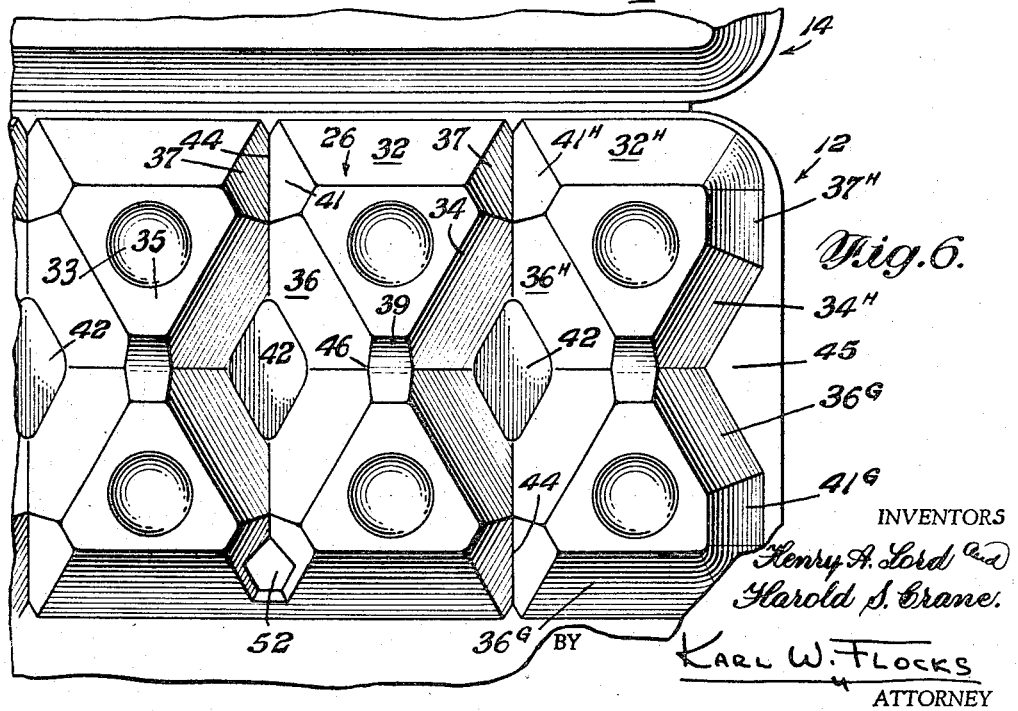
Fig. 6 is an enlarged view of the right-hand end of the bottom of the egg carton as viewed in Fig. 5.

A flap member 50 which extends for a short distance less than the entire length of the carton is integrally hinged to the forward rim of the carton. When the carton is in closed position, as seen in Figs. 4, 7, 8 and 9, flap member 50 is bent upwardly from a normally horizontal position through an angle of slightly more than 90 degrees into a plane slightly beyond the vertical plane so as to lie inside cover member 14 as best seen in Fig. 4. Tab portions 25 of the cover member are then inserted through slots 52 which are formed in several of the auxiliary wall portions 37 and 41 between adjacent connected forward wall portions 32 of cells 26 lying in forward cell row 28.

The cell construction hereinbefore described provides a firm support for eggs positioned in the cells. The substantially equilateral triangle formed by the walls of each egg cell provides a three-point support for the egg in each cell which insures a constant positive contact with the egg at all times, thereby resisting and preventing rattling and movement of the eggs within the cells. The triangular-shaped egg cell provides an egg-receiving pocket whose individual sides are longer than those of a cell having four sides. As a result, each side is capable of greater deflection than a four-sided cell and consequently provides a greater cushioning action on the egg positioned in a given cell. Furthermore, the flexibility of the cell walls permits a variety of egg shapes and sizes to be packed within the same carton.

A further advantage of the construction hereinbefore described is that the center posts, together with the laterally extending ridges 44 and the longitudinally extending ridges 46 provide a bracing structure which resists externally applied forces tending to cause lateral and longitudinal deformation of the carton, although the individual cells are amply flexible to accommodate eggs positioned therein.

It will be obvious to those skilled in the art that various changes may be made without departing from the spirit of the invention and therefore the invention is not limited to what is shown in the drawings and described in the specification but only as indicated in the appended claim.

What is claimed is:

A molded pulp egg carton comprising two rows of cuplike egg cells, a row of upstanding posts between said rows of cells, each of said posts having a discrete base and a top, said base being generally diamond-shaped with the long axis of said diamond extending transversely of the axes of said diamond extending transversely of the axes of said rows, and the short axis of said base being generally parallel to the axes of said rows, said top being generally diamond-shaped with the long axis of said top extending transversely of the axes of said rows, said cells each having a generally triangular shaped bottom including three major sides, cell forming walls extending upwardly from each of said three major sides, one of said cell forming walls of a cell forming a part of a post and broader at the base than at the top, complementary wall formations in addition to said cell forming walls to effect a closed geometrical figure for the horizontal section of each cell taken above the bottom thereof.

References Cited in the file of this patent

UNITED STATES PATENTS

| | | |
|---|---|---|
| 1,975,129 | Sherman | Oct. 2, 1934 |
| 2,423,756 | Chaplin | July 8, 1947 |
| 2,529,140 | Cox | Nov. 7, 1950 |
| 2,756,918 | Schwartzberg | July 31, 1956 |
| 2,815,162 | Grant | Dec. 3, 1957 |

FOREIGN PATENTS

| | | |
|---|---|---|
| 164,896 | Australia | July 2, 1953 |